(12) United States Patent
Wehrl et al.

(10) Patent No.: US 12,444,101 B2
(45) Date of Patent: Oct. 14, 2025

(54) METHOD AND SYSTEM FOR CREATING A QUANTITATIVE POSITRON EMISSION TOMOGRAPHY IMAGE

(71) Applicant: Siemens Healthcare GmbH, Erlangen (DE)

(72) Inventors: Hans Wehrl, Erlangen (DE); Matthias Fenchel, Erlangen (DE); Silvia Bettina Arroyo Camejo, Fuerth (DE); Bjoern Jakoby, Nuremberg (DE); Julian Wohlers, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 248 days.

(21) Appl. No.: 18/310,626

(22) Filed: May 2, 2023

(65) Prior Publication Data

US 2023/0355189 A1 Nov. 9, 2023

(30) Foreign Application Priority Data

May 5, 2022 (DE) .................... 10 2022 204 448.7

(51) Int. Cl.
*A61B 6/03* (2006.01)
*A61B 6/00* (2024.01)
(Continued)

(52) U.S. Cl.
CPC ............ *G06T 11/008* (2013.01); *A61B 6/037* (2013.01); *A61B 6/5258* (2013.01);
(Continued)

(58) Field of Classification Search
CPC ................ G06T 7/0012; G06T 7/0014; G06T 2207/10072; G06T 2207/10081;
(Continued)

(56) References Cited

U.S. PATENT DOCUMENTS

| 7,652,259 B2 * | 1/2010 | Kimchy | ................. A61B 6/482 600/407 |
| 8,406,495 B2 * | 3/2013 | Gagnon | .................... G06T 7/11 382/128 |

(Continued)

FOREIGN PATENT DOCUMENTS

| CN | 110811665 A | 2/2020 |
| DE | 102015203932 A1 | 9/2016 |
| DE | 112019001989 T5 | 12/2020 |

OTHER PUBLICATIONS

Laymon, Charles M., and James E. Bowsher. "Anomaly detection and artifact recovery in pet attenuation-correction images using the likelihood function." IEEE journal of selected topics in signal processing 7.1, pp. 137-146 (Year: 2013).*

(Continued)

*Primary Examiner* — Scott A Rogers
(74) *Attorney, Agent, or Firm* — Harness, Dickey & Pierce, P.L.C.

(57) ABSTRACT

A method for creating a quantitative positron emission tomography (PET) image of a subject or object comprises recording correction information data with an imaging device; transmitting the correction information data to a first evaluating unit which includes at least one of preparing an attenuation map on based on the correction information data and passing on the attenuation map as checking data to a second evaluating unit or sending the correction information data as checking data to the second evaluating unit; assessing the checking data based on a quantity of reference data and detecting possible artifacts in the checking data by way of the second evaluating unit; at least one of initializing correction measures by way of the second evaluating unit or proposing correction measures to a user; and preparing a corrected attenuation map based on the correction measures.

20 Claims, 1 Drawing Sheet

(51) Int. Cl.
*G06T 7/00* (2017.01)
*G06T 11/00* (2006.01)

(52) U.S. Cl.
CPC .. *G06T 7/0014* (2013.01); *G06T 2207/10081* (2013.01); *G06T 2207/10088* (2013.01); *G06T 2207/10104* (2013.01)

(58) Field of Classification Search
CPC . G06T 2207/10088; G06T 2207/10104; G06T 11/005; G06T 11/008; A61B 6/037; A61B 6/5258
See application file for complete search history.

(56) References Cited

U.S. PATENT DOCUMENTS

| | | | |
|---|---|---|---|
| 8,611,628 B2* | 12/2013 | Hu | G06T 11/006 |
| | | | 382/131 |
| 8,923,592 B2* | 12/2014 | Wollenweber | G06T 5/50 |
| | | | 382/131 |
| 9,445,722 B2* | 9/2016 | Blumhagen | A61B 5/0035 |
| 9,466,133 B2* | 10/2016 | Sowards-Emmerd | |
| | | | A61B 6/037 |
| 9,706,972 B1 | 7/2017 | Ahn et al. | |
| 11,302,003 B2* | 4/2022 | Liu | G06T 5/50 |
| 11,756,192 B2* | 9/2023 | Schleyer | G06T 5/94 |
| | | | 382/131 |
| 11,854,126 B2* | 12/2023 | Schaefferkoetter | G06T 3/14 |
| 12,067,654 B2* | 8/2024 | Connell | G06T 11/005 |
| 2015/0057535 A1* | 2/2015 | Sitek | A61B 6/5205 |
| | | | 382/131 |
| 2016/0069973 A1* | 3/2016 | Fenchel | G01R 33/481 |
| | | | 324/309 |
| 2016/0259024 A1 | 9/2016 | Bachschmidt et al. | |
| 2019/0370958 A1 | 12/2019 | Hancu et al. | |
| 2020/0089983 A1 | 3/2020 | Manickam et al. | |
| 2021/0156940 A1 | 5/2021 | Sommer et al. | |
| 2021/0248728 A1* | 8/2021 | Hu | G06T 5/50 |
| 2022/0068472 A1 | 3/2022 | Arroyo Camejo et al. | |
| 2023/0056685 A1* | 2/2023 | Vahle | G06T 11/005 |
| 2024/0404128 A1* | 12/2024 | Shah | G06T 7/11 |

OTHER PUBLICATIONS

Akbarzadeh, A., et al. "Impact of using different tissue classes on the accuracy of MR-based attenuation correction in PET-MRI." 2011 IEEE Nuclear Science Symposium Conference Record. IEEE (Year: 2011).*

Lee, Jae Sung. "A review of deep-learning-based approaches for attenuation correction in positron emission tomography." IEEE Transactions on Radiation and Plasma Medical Sciences 5.2, pp. 160-184 (Year: 2020).*

Krokos, Georgios, et al. "A review of PET attenuation correction methods for PET-MR." EJNMMI physics 10.1, p. 52 (Year: 2023).*

Mehranian, Abolfazl, Hossein Arabi, and Habib Zaidi. "Vision 20/20: magnetic resonance imaging-guided attenuation correction in PET/MRI: challenges, solutions, and opportunities." Medical physics 43.3, pp. 1130-1155 (Year: 2016).*

Hofmann, Matthias, et al. "Towards quantitative PET/MRI: a review of MR-based attenuation correction techniques." European journal of nuclear medicine and molecular imaging 36, pp. 93-104 (Year: 2009).*

Keller, Sune H. et al: "Image artifacts from MR-based attenuation correction in clinical, whole-body PET/MRI.", Magnetic Resonance Materials in Physics, Biology and Medicine, 2013, 26. Jg., pp. 173-181 .

* cited by examiner

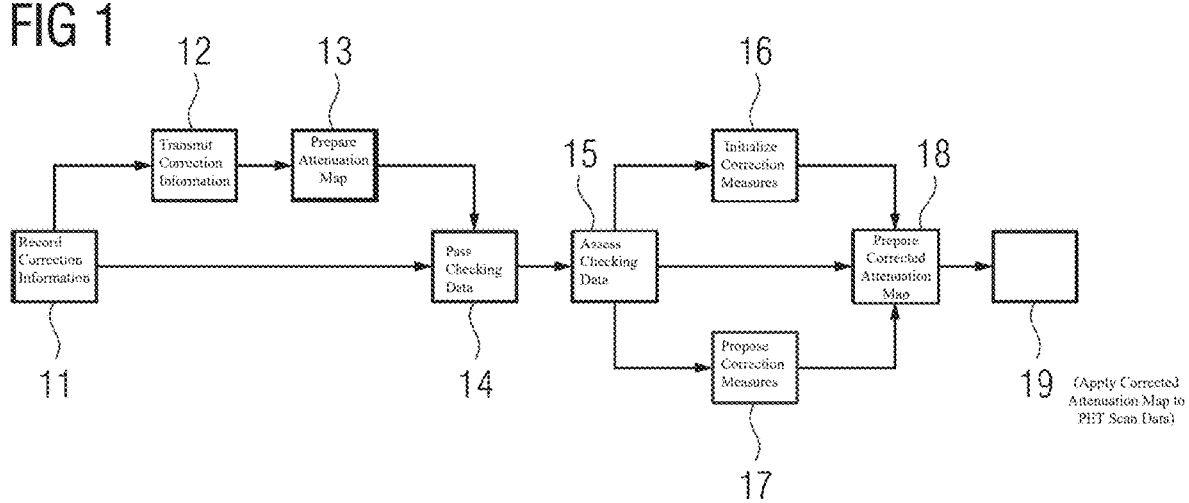
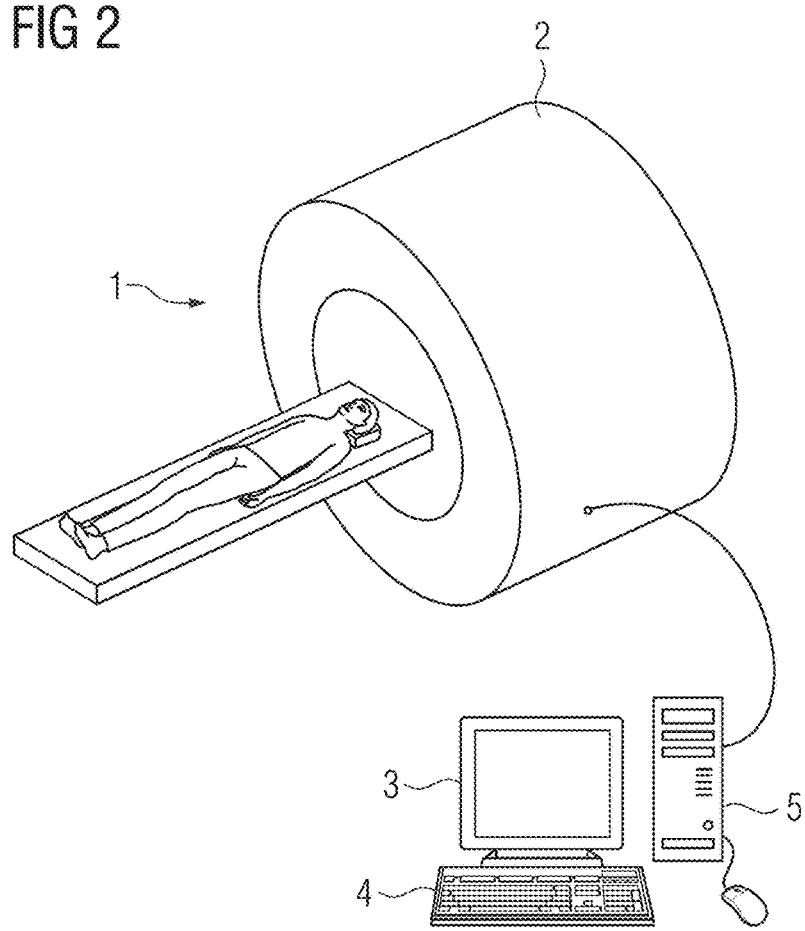

METHOD AND SYSTEM FOR CREATING A QUANTITATIVE POSITRON EMISSION TOMOGRAPHY IMAGE

CROSS-REFERENCE TO RELATED APPLICATION(S)

The present application claims priority under 35 U.S.C. § 119 to German Patent Application No. 10 2022 204 448.7, filed May 5, 2022, the entire contents of which are incorporated herein by reference.

FIELD

One or more example embodiments relates to a method for creating a quantitative positron emission tomography image, a positron emission tomography system, a computer program and a non-volatile computer-readable medium.

RELATED ART

Positron emission tomography (PET) is often combined with other imaging methods, in particular magnetic resonance tomography (MRT) and computed tomography (CT). PET offers the possibility for quantifying biologically or medically relevant parameters, for example by administering radiopharmaceuticals and tracking their (possibly time-dependent) quantity and distribution in the body (the tracer principle or tracer kinetics). It is a precondition therefor that the PET supplies quantitative, reproducible and, as far as possible, artifact-free images. In order to generate PET images, during the reconstruction of the images, correction factors are typically applied. The corrections can comprise, in particular, a normalization, an attenuation and/or absorption correction and scattering correction. Therein, the attenuation of the signal by way of the absorption of photons in the tissue slices is to be taken into account by way of attenuation corrections. This attenuation can differ individually for different patients, dependent upon the particular property of the tissue, in particular, the material and/or thickness. The attenuation correction is typically necessary in order to obtain quantitative PET images. In order to obtain quantified PET images, an attenuation correction map, hereinafter named attenuation map for short, is therefore prepared which takes account of the tissue properties and possibly also further factors, such as MR coils in the imaging region. The attenuation map can be prepared by recording additional image data, for example, additional MRT images or CT images and/or by way of PET scan data. The additional image data is often recorded together with and/or shortly before the actual main imaging method.

SUMMARY

However, the attenuation maps often themselves have artifacts which can influence the reliability of the corrected PET image. For example, movements of a patient, unusual properties of a body part or other image artifacts can lead to a faulty quantification of the PET images.

This problem is confronted in that a user, for example an imaging technician or a medical professional observes and compares both the image corrected with the attenuation map and also the uncorrected image. Depending upon the expertise and attentiveness of the user, however, some faults, in particular relatively small details, can be missed, leading to erroneous diagnoses. In addition, the alignment of a plurality of versions of an image implies added effort for the user. Furthermore, a subsequently ascertained error is possibly corrected in that the entire scan is repeated, leading to additional effort and costs. This problem is particularly pronounced in the case of PET/MRT since technicians who operate the PET/MRT system, in particular nuclear medicine specialists, often do not have any particular specialist knowledge in the use and interpretation of MRT imaging per se. Consequently, therefore, artifacts particularly often cannot be recognized by way of an attenuation map generated with MRT.

Therefore, one or more example embodiments provides a method for generating a quantitative PET image in which the occurrence of artifacts created in the PET image by way of the attenuation map can be reduced.

BRIEF DESCRIPTION OF THE DRAWINGS

Embodiments will now be described making reference to the accompanying drawings.

FIG. 1 shows a flow diagram which illustrates a method according to one or more example embodiments for creating a quantitative positron emission tomography image of a subject or object, and FIG. 2 shows a schematic representation of a positron emission tomography system according to one or more example embodiments.

DETAILED DESCRIPTION

According to one or more example embodiments, a method is provided for creating a quantitative positron emission tomography (PET) image of a subject or object, in particular in the context of a PET/MR imaging process, a PET/CT imaging process and/or a PET imaging process. The method comprises the following steps:

(a) recording correction information data with at least one imaging device, in particular with a magnetic resonance scanner, with a computed tomography scanner and/or with a positron emission tomography scanner;

(b) transmitting the correction information data or a first part of the correction information data to a first evaluating unit, preparing an attenuation map on the basis of the correction information data by way of the first evaluating unit and passing on the attenuation map as checking data to a second evaluating unit and/or passing on the correction information data or a second part of the correction information data as checking data to the second evaluating unit;

(c) assessing the checking data on the basis of a large quantity of reference data and detecting possible artifacts in the checking data by way of the second evaluating unit;

(d) in the event of the detection of at least one artifact, initializing correction measures by way of the second evaluating unit and/or proposing correction measures to a user by way of the second evaluating unit via an output device and providing the possibility for the user to initialize the correction measures and/or correction measures modified by the user, wherein the correction measures are configured to weaken and/or eliminate the at least one artifact;

(e) preparing a corrected attenuation map on the basis of the correction measures, wherein the corrected attenuation map corresponds to an uncorrected attenuation map if no artifacts have been detected; and (f) optionally receiving positron emission tomography scan data and applying the corrected attenuation map to the positron emission tomography scan data, in order to create a quantitative positron emission tomography image.

The subject can be, in particular, a test subject or a patient and the object can be, for example, a body part of the patient.

The first evaluating unit and/or the second evaluating unit can be part of a control unit. The first evaluating unit and/or the second evaluating unit can be arranged on the same computer unit and/or can be part of the same evaluating program. In particular, the first evaluating unit and the second evaluating unit can be structurally combined and/or identical.

Although solutions according to the prior art must rely upon the judgement and/or estimation of the user, for example the technician or physician, to verify the reliability of PET images and therefore must often accept an increased time expenditure and/or an increased error probability, according to experience and/or competence, this method offers a reliable and often a faster alternative. Particularly with less experienced users, the probability that image artifacts are overlooked is increased, which in turn can lead to faulty and/or false diagnoses. In addition, with the method according to one or more example embodiments, a correction can be undertaken, if relevant, as early as during the examination, i.e. in particular while a patient is still situated in the imaging scanner. Advantageously, in the case of a faulty attenuation map, a repetition of the whole examination or alternatively, an evaluation without an attenuation map (i.e. a non-quantitative evaluation) can thus be avoided, if relevant, by way of the correction measures. The preparing of the attenuation map and/or the corrected attenuation map can therein enable the quantitative evaluation of the PET data.

The method can be applied, in principle, to different scanning methods which comprise PET imaging. Particularly preferably, the method can be applied in the context of a PET/MR imaging process, a PET/CT imaging process and/or a PET imaging process. The correction information data can preferably be recorded by at least one imaging device that is also used in the actual imaging method. For example, the correction information data can be recorded with a magnetic resonance scanner, with a computed tomography scanner and/or with a positron emission tomography scanner. It is conceivable that the correction information data is recorded with combination devices, for example PET/MR, PET/CT, and it can thus also be recorded with a plurality of modalities and combined therefrom. Correction information data can be recorded from a PET scanner, for example, with the aid of a rotating PET radiation source.

Preferably, the correction information data can be recorded at the start of the examination of the subject and/or object. The correction information data can be recorded as a first scan and/or as a first data recording immediately after the recording of a localization image for localizing the region and/or object to be examined. The correction information data can be, for example, MR data, CT data, PET data, PET/MR data or PET/CT data. Advantageously thereby, an evaluation and/or assessment of this correction information data can be undertaken while the examination is still underway, wherein, in particular, a correction, for example, a re-measurement of the correction information data can also still be possible during the examination.

The correction information data in particular is suitable and/or is configured so that an attenuation map can be established from it. In the context of this invention, the attenuation map can also be designated the attenuation correction map. The expression "attenuation" relates therein, in particular, to an absorption of the scan signal by objects, for example, tissue and/or other body parts, implants and/or objects arranged between the radiation source and the detector(s). On the basis of individual differences between different subjects, in particular different patients, the absorption of the PET signal can be different in different subjects. For example, the tissue and/or the tissue thickness, for example, the thickness of fat tissue can differ between different patients. Implants such as heart pacemakers, can have an influence on the absorption and therefore on the attenuation of the signal and/or can cause artifacts.

The correction information data can be transmitted to the first evaluating unit after the recording. Preferably, the correction information data can be passed on directly after the recording to the evaluating unit, i.e. in particular within a timespan of less than one minute. The first evaluating unit is configured, in particular, to produce the attenuation map on the basis of the correction information data. The first evaluating unit can additionally be configured, for calculating the attenuation map, to take into account additional information, for example the PET scan data. The attenuation map can then be transmitted from the first evaluating unit to the second evaluating unit. Alternatively or additionally, the correction information data can be transmitted directly, in particular directly from the imaging device, to the second evaluating unit. The correction information data can be used to establish further and/or more detailed information relating to possible artifacts. If the correction information data is passed on directly to the second evaluating unit, it can be provided that the data is checked before the attenuation map is calculated. Advantageously, in this way, computing time for calculating the attenuation map can be spared. In particular, it can be provided that the attenuation map is only to be calculated when it has been ascertained that the correction information data has no artifacts and/or no undesirable artifacts. This data transmitted to the second evaluating unit is designated checking data in the context of this invention. In other words, the checking data can comprise the attenuation map, the correction information data and/or both the attenuation map and also the correction information data. If both the correction information data and the attenuation map are passed to the second evaluating unit, the second evaluating unit can be configured to establish from the combined checking data, specifically the correction information data and the attenuation map, the presence of possible artifacts. Advantageously, it can thus be made possible to detect artifacts particularly reliably. Additionally or alternatively, the attenuation map can be based upon a first part of the correction information data, wherein the correction information passed on as checking data is based upon the entire correction information or upon a second part of the correction information data. In particular, it can be provided that the first part of the correction information data is used for preparing the attenuation map, while the second part of the correction information data or the entire correction information data is passed on directly to the second evaluating unit so that the second evaluating unit carries out an assessment on the basis of the attenuation map and of the second part of the correction information data or on the basis of the entire correction information data. For example, the first part of the correction information data comprises MR data for creating the attenuation map. For example, the second part of the correction information data can comprise PET data, in particular the PET scan data. The PET scan data together with the attenuation map can be attenuation-corrected PET scan data. According to one embodiment, the checking data can comprise the attenuation-corrected PET scan data and the PET scan data (and/or uncorrected PET scan data).

The second evaluating unit can be configured to assess the checking data on the basis of a large quantity of reference data and to detect possible artifacts in the checking data. The second evaluating unit can be configured, when assessing the checking data, to compare the PET scan data and the attenuation-corrected PET scan data. Artifacts can be caused, for example, by anomalies in the subject or object and/or by scanning errors. For example, artifacts can be caused by missing body parts/limbs, by implants or by objects situated in the scanning region. Scanning errors can be caused, for example, by faulty scan parameters and/or by (external) interfering signals, for example RF radiation. According to one variant, the second evaluating unit can be configured to use camera data of the subject and/or the object that is provided by a camera for the assessment. The camera data can comprise, in particular, information relating to the movement of the subject and/or object and/or the physiological data of the subject and/or the object. For example, the camera can film the subject/object during the examination and/or record images at regular intervals. The physiological data can also comprise, for example, extremely recognizable indications of anomalies in the subject and/or the object which lead or can lead to artifacts.

The second evaluating unit can be configured, in the event of the detection of at least one artifact, to initialize correction measures. The correction measures can be initialized, for example, in that a command is transmitted to the first evaluating unit to adapt the evaluating parameters. Alternatively or additionally, the repetition of the recording of the correction information data or a part of the correction information data can be initiated, wherein optionally, for example, scan parameters can be adapted. Alternatively or additionally, the second evaluating unit can be configured to propose correction measures to a user via an output device. It can further be provided that the possibility is provided to the user, via an input unit, of initializing the correction measures and/or correction measures modified by the user. For example, correction measures can be proposed to the user wherein the user has the possibility of adapting parameters, for example scan parameters of a repetition scan, and/or to select alternative correction measures. The modified correction measures can also comprise the provision of no correction measures at all. In other words, it can optionally be provided that the user specifies an uncorrected retention of the attenuation map. This can be advantageous, for example, if the user is convinced that the attenuation map is sufficiently good, contrary to the recommendation. It can be provided that an error message is output to the user if at least one artifact has been detected. The proposing of correction measures can advantageously permit a user to be induced to pay attention to anomalies and/or artifacts and/or to recognize them at all. In addition to the expertise and/or attention of the user, a second, in particular, independent control mechanism can thus be enabled.

On the basis of the correction measures, a corrected attenuation map can be prepared. The correction measures can be correction measures amended by the user. The corrected attenuation map can be prepared by way of the first evaluating unit and/or by way of the second evaluating unit. The corrected attenuation map can be prepared, dependent upon the selected correction measures making use of further measurements by the at least one imaging device. If no artifacts have been detected, it can advantageously be provided that no corrections are applied. Accordingly, in this case, the corrected attenuation map can correspond to an uncorrected attenuation map.

The positron emission tomography (PET) scan data can be recorded by the imaging device which also records the correction information data. In particular, it can preferably be provided that the PET scan data is recorded in the same examination procedure in which the correction information data is also recorded. Advantageously, a plurality of aspects, specifically the actual examination scan, the recording of the correction information data together with the creation of the attenuation map and a possible correction of the attenuation map and/or of the correction information data can therefore be accomplished in one examination procedure. The PET scan data can optionally be ToF-PET scan data (where ToF stands for "time of flight"). Advantageously, with a ToF-PET scan, the signal-to-noise ratio and/or the spatial resolution of the scan can be improved.

According to a preferred embodiment, the reference data comprises, in particular, reference attenuation maps and/or reference correction information data. The reference data can originate, in particular, from the same subject or object and/or from the same type of subject and/or object as the object or subject being examined. In particular, the reference attenuation maps, attenuation maps and/or the reference correction information data can originate from the examined object, for example, an examined body region and/or from objects corresponding to the examined object, i.e. in particular similar body regions. A similar body region can be, in particular, the same and/or corresponding body region, but from another subject and/or from another patient.

According to one embodiment, the first evaluating unit and/or the second evaluating unit can (each) comprise a trained algorithm. The trained algorithm can, in particular, be based upon an artificial intelligence. For example, the trained algorithm of the first evaluating unit and/or the second evaluating unit can be based upon deep learning and/or can comprise a neural network (NN). For example, the NN can comprise a number of 4-20 layers of which at least some can be convolutional layers and optionally some can be fully networked layers. The architecture of the NN can be comparable, for example, with that of an object-recognition NN such as YOLO by Joseph Redmon.

According to one embodiment, the second evaluating unit has been trained via input training data and output training data, wherein the input training data comprises a large quantity of reference data, in particular reference attenuation maps and/or reference correction information data, wherein the output training data comprises a predetermined classification and/or a predetermined assessment of the artifacts in the input training data. The second evaluating unit can be, in particular, an algorithm trained via the input training data and via the output training data. The large quantity of reference data can be specified automatically or by a user. The output training data can comprise a classification determined, in particular, manually by a user and/or automatically, according to which the reference data is subdivided into artifact-containing data and artifact-free data and/or according to which the position of artifacts in the reference data is determined. In addition or alternatively, the output training data can comprise an assessment of the artifacts in the reference data. The assessment of the artifacts can comprise, for example, a subdivision into significance regions and/or regions of differently-sized significance according to which, in particular, significance thresholds can be specified. The assessment and/or classification can comprise a subdivision of the reference data into quality classes. For example, two quality classes can be provided, specifically in particular poor, i.e. with at least one artifact, and good, i.e. with no artifact. Alternatively or additionally, further quality classes can be provided, for example, a stepped assessment from very poor, i.e. in particular, very many and/or very marked artifacts to very good, i.e. in particular no and/or no significant artifacts. A plurality of quality classes can be used, for example, for the subdivision into significance ranges.

According to one embodiment, the artifacts comprise anatomical anomalies, in particular missing extremities and/or implants, artifacts caused by movement of the subject, metal artifacts, Gibbs artifacts, aliasing and/or wrap-around artifacts, artifacts caused by RF noise and/or artifacts caused by chemical shift. Gibbs artifacts are, in particular, "Gibbs ringing" caused by the Gibbs phenomenon, whereby, in particular, additional contours can arise in the image data. Implants can lead, for example, to a distortion. Aliasing artifacts can occur due to too little sampling (i.e. in particular, too few data points) in an MR scan. Wrap-around artifacts can arise, for example, as a subform of the aliasing artifacts if the field of view set for an MR scan is too small in relation to the size of the object being observed. Therein, parts of the object can appear folded back into the field of view. Artifacts due to chemical shift can arise, for example, if the different resonance frequencies of water and fat are not taken into account in MR scans. In this way, for example, light or dark lines and/or contours which make the interpretation more difficult and/or falsify it can appear. Additionally or alternatively, the artifacts can be caused by a low signal-to-noise ratio, for example, due to unsuitable measuring instrument and/or coil placement, and/or can be ghosting artifacts due, in particular, to insufficient breath holding by a patient.

According to one embodiment, the assessment of the checking data can be carried out on the basis of reference data, in particular reference attenuation maps and/or reference correction information data, in accordance with a predetermined classification of artifacts. The second evaluating unit can be configured to differentiate between a plurality of classes of artifacts and/or anomalies. Different classes of artifacts can be, for example, anatomical anomalies, artifacts caused by movement of the subject, metal artifacts, Gibbs artifacts, aliasing and/or wrap-around artifacts, artifacts caused by RF noise and/or artifacts caused by chemical shift. A plurality of subclasses can be provided for each, further subdividing the classes, for example, according to a degree of severity of the artifacts and/or according to a subcategory of the artifacts. For example, subcategories of the anatomical anomalies can be implants and/or missing extremities. Furthermore, subcategories of implants can be different types of implant, for example, cardiac pacemakers or dental prostheses. Advantageously, known potential error sources can thus be recognized more easily according to the reference data and, if relevant, suitable countermeasures can be introduced, for example, an automatic performance of correction measures or a proposal of correction measures.

According to one embodiment, the assessment is carried out on the basis of reference attenuation maps and/or reference correction information data according to a predetermined assessment measure, wherein the predetermined assessment measure comprises differentiating criteria, in particular significance thresholds, according to which anomalies in the attenuation map and/or in the correction information data can be classified as artifact or no artifact. The significance thresholds can be selected and/or predetermined, for example, according to a required quality of a particular examination. The significance thresholds can be adjustable for a user. For example, a user interface can be provided via which the user can set the significance thresholds. The second evaluating unit can be configured to accept the user input and/or to adapt the assessment measure according to the user input.

According to one embodiment, the second evaluating unit comprises a catalog of measures which are associated with the predetermined classification and/or the assessment measure, wherein the catalog of measures comprises, in particular:

proposing correction measures to the user
automatic execution of correction measures
optional output of information to the user via the output device. The correction measures can be adapted to the respective artifact, in particular according to the classification of artifacts and/or according to the assessment measure as described herein. The proposing of correction measures to the user and/or the correction measures can comprise, for example: continuing with the scan and/or the examination, repeating a measurement, in particular repeating the recording of the correction information data, adapting scan parameters and/or repeating the scan and/or the examination. For example, it can be intended to enlarge a field of view of a scan, in particular automatically, and/or to adapt a phase/frequency encoding, in particular dependent upon the severity and/or significance of a wrap-around artifact. Gibbs artifacts that occur can be remedied and/or moderated in that an increased sampling rate is used. The correcting measures can be adjustable according to a user specification. It can be provided that the proposing of correction measures and/or the initiating of correction measures can be adapted and/or adjusted according to user input. The user inputs can be usable, for example, on all or one predetermined part of all the subsequent scans. It can be provided to enable a user to define some solution strategies for potential artifacts and/or problems and/or such as can be recognized by the second evaluating unit, in particular by way of input via an input device. The solution strategies can be stored, for example, by the second evaluating unit and used and/or taken into account for the initiating of correction measures and/or the proposing of correction measures. Additionally or alternatively, significance thresholds, in particular the above-mentioned significance thresholds can be used to determine whether a user is informed about an artifact.

According to one embodiment, it can be provided that the correction information data is recorded by a magnetic resonance (MR) scanner which, in particular, is part of an MR/PET combination device, wherein the correction information is based, in particular, on MR Dixon images. MR Dixon images can be particularly well suited to preventing and/or weakening artifacts based upon faulty calculation and/or classification of tissue images, in particular relating to the differentiation between fat images and water images. For example, a classification according to air, bone, water, fat and/or other tissues/objects can be provided.

According to one embodiment, when correction measures are proposed to a user, additional information regarding the at least one detected artifact, in particular comprising a pictorial representation of the artifact, is output via the output device to the user. A marking of the artifact can be provided in the image. It can be provided that the marking and/or the additional information is able to be configured by the user. Additionally or alternatively, it can be provided that a close-up recording is provided with a reduced field of view around the artifact. It can be provided that, in the pictorial representation of the artifact, the artifact is emphasized by way of a segmentation. Advantageously, the additional information can provide additional support to the user for assessing and/or recognizing the artifacts.

According to one embodiment, the correction measures comprise a repetition of the recording of the correction information data and/or an adaptation of recording parameters, in particular for a recording of the correction information data, which is to be repeated. The correction measures can be carried out automatically and/or proposed to a user for confirming and/or adapting. The adapting of parameters can be based upon a classification of artifacts, in particular as described herein. For example, the TE time or another parameter of an MR sequence can be changed, in particular a parameter with which the correction information data has been recorded, can be reduced, in particular when a missing signal is recognized during the assessment.

According to one or more example embodiments a positron emission tomography system comprises an imaging device, an output device, an input device and a control unit, wherein the control unit comprises a first evaluating unit and a second evaluating unit and wherein the control unit is configured to actuate the imaging device, wherein the control unit is configured, in particular, to initiate the method steps according to the method as described herein, wherein the imaging device is configured to record correction information data, wherein the imaging device is, in particular, a magnetic resonance scanner, a computed tomography scanner and/or a positron emission tomography scanner, wherein the imaging device is configured to transmit the correction information data to the first evaluating unit, wherein the first evaluating unit is configured to produce an attenuation map on the basis of the correction information data and to pass on the attenuation map as checking data to the second evaluating unit and/or wherein the imaging device is configured to pass on the correction information data as checking data to the second evaluating unit, wherein the second evaluating unit is configured to assess the checking data on the basis of a large quantity of reference data and to detect possible artifacts in the checking data, wherein the second evaluating unit is configured, in the event of the detection of at least one artifact, to initialize correction measures and/or to propose correction measures via the output device to the user, wherein the input device is configured to enable a user to initialize the correction measures and/or correction measures modified by the user, wherein the control unit is configured to process the correction measures input by the user, wherein the correction measures are configured to weaken and/or eliminate the at least one artifact, wherein the control unit is configured to produce corrected correction information data and/or a corrected attenuation map on the basis of the correction measures, wherein the corrected correction information data and/or the corrected attenuation map corresponds to the uncorrected correction information data and/or the uncorrected attenuation map if no artifact has been detected, wherein the control unit is configured to receive positron emission tomography scan data and to apply the corrected attenuation map to the positron emission tomography scan data in order to create a quantitative positron emission tomography image. All the advantages and features of the method can be transferred likewise to the positron emission tomography system and vice versa. The control unit can be, for example, a computer or part of a computer. The computer can be, for example, a PC, a console of an examination device, a mobile device such as a laptop computer, a tablet or a smartphone.

According to one or more example embodiments a computer program comprises instructions which, when the computer program is executed on a control unit of a positron emission tomography system, cause the positron emission tomography system to carry out the method steps of the method as described herein. All the advantages and features of the method and of the positron emission tomography system can be transferred similarly to the computer program and vice versa.

According to one or more example embodiments a non-volatile computer-readable medium on which there is stored a computer program comprises instructions which, when the computer program is executed on a control unit of a positron emission tomography system, cause the positron emission tomography system to carry out the method steps of the method as described herein. All the advantages and features of the method, of the positron emission tomography system and of the computer program can be transferred similarly to the computer-readable medium and vice versa. The non-volatile computer-readable medium can be any digital storage medium, for example, a hard disk drive, a server, a cloud, a computer, an optical and/or magnetic storage medium, a CD-ROM, an SSD drive, an SD card, a DVD or Blu-ray disk and/or a USB stick.

All the embodiments described herein can be combined with one another, where not explicitly stated otherwise.

FIG. 1 shows a flow diagram which illustrates a method according to one or more example embodiments for creating a quantitative positron emission tomography image (PET image) of a subject or object. The method can preferably be applied in the context of a PET/MR imaging process, a PET/CT imaging process and/or a PET imaging process. In a first step 11, correction information data is recorded with at least one imaging device 2. The imaging device 2 can be, for example, a magnetic resonance scanner, a computed tomography scanner and/or a positron emission tomography scanner. In the subsequent step 12, the correction information data or a first part of the correction information data can be transmitted to a first evaluating unit. In the step 13, the first evaluating unit prepares an attenuation map on the basis of the correction information data. This attenuation map is then further processed as checking data. Alternatively or additionally, the correction information data itself or a second part of the correction information data can be treated as checking data.

In the next step 14, the checking data is passed on to a second evaluating unit. In the step 15, the checking data is assessed by the second evaluating unit on the basis of a large quantity of reference data and possible artifacts in the checking data are detected. The reference data can preferably comprise reference attenuation maps and/or reference correction information data. The artifacts can comprise, for example, missing extremities and/or implants, artifacts caused by movement of the subject, metal artifacts, Gibbs artifacts, aliasing and/or wrap-around artifacts, artifacts caused by RF noise and/or artifacts caused by chemical shift. The assessment of the checking data can be carried out according to a predetermined classification of artifacts and/or according to a predetermined assessment measure. Preferably, the assessment measure can comprise differentiating criteria, in particular, significance thresholds, according to which anomalies in the attenuation map and/or in the correction information data can be classified as artifact or no artifact.

The first evaluating unit and/or the second evaluating unit can be part of a control unit 5 and/or can comprise a trained algorithm. In particular, the second evaluating unit can have been trained via input training data and via output training data. Therein, the input training data can comprise a large quantity of reference data, in particular reference attenuation maps and/or reference correction information data, wherein the output training data can comprise a predetermined classification and/or a predetermined assessment of the artifacts in the input training data.

If no artifacts are discovered, the process advances directly to step 18. In the event of the detection of at least one artifact, in step 16, correction measures are initialized by way of the second evaluating unit. Alternatively or additionally, in step 17, correction measures are proposed to a user by way of the second evaluating unit via an output device 3 and the possibility is provided to the user of initializing the correction measures and/or correction measures modified by the user. Optionally, it can be provided that when correction measures are proposed to the user, additional information regarding the at least one detected artifact, in particular comprising a pictorial representation of the artifact is output via the output device 3 to the user. The pictorial representation of the artifact can comprise, for example, a segmentation of the artifact. Therein, the correction measures are configured to weaken and/or eliminate the at least one artifact. In particular, the second evaluating unit can comprise a catalog of measures which are associated with the predetermined classification and/or the assessment measure. In particular, the correction measures comprise a repetition of the recording of the correction information data and/or an adaptation of recording parameters for a recording of the correction information data, which is to be repeated.

In step 18, a corrected attenuation map is prepared on the basis of the correction measures. The corrected attenuation map can therein correspond to an uncorrected attenuation map if no artifacts have been detected. Finally, in step 19, positron emission tomography scan data is received and the corrected attenuation map is applied to the positron emission tomography scan data in order to create a quantitative positron emission tomography image.

FIG. 2 shows a schematic representation of a positron emission tomography system 1 according to one or more example embodiments. An imaging device 2 of the system 1 is configured to record correction information data. The imaging device 2 can be, in particular, a magnetic resonance scanner, a computed tomography scanner and/or a positron emission tomography scanner. The imaging device 2 can be configured to carry out different imaging methods, in particular a PET imaging and a further, for example MR, imaging. The imaging device 2 is further configured to transmit the correction information data to a first evaluating unit. In this embodiment, the first evaluating unit is part, together with a second evaluating unit, of a control unit 5 which is configured to actuate the imaging device 5 and/or to control the imaging device 5. In particular, the control unit 5 is configured to execute the method steps as described in relation to FIG. 1 and/or to initiate their execution. The method steps can preferably be stored as a computer program on a computer-readable medium which can be, in particular, part of the control unit or can be connected to the control unit.

The first evaluating unit is configured to produce an attenuation map on the basis of the correction information data obtained from the imaging device 5 and to pass on the attenuation map as checking data to the second evaluating unit. Alternatively or additionally, the imaging device is configured to pass on the correction information data as checking data to the second evaluating unit.

The second evaluating unit is configured, as part of the control unit 5, to assess the checking data on the basis of a large quantity of reference data and to detect possible artifacts in the checking data. If the second evaluating unit detects at least one artifact, it is configured to initialize correction measures to eliminate and/or weaken the artifacts and/or to propose correction measures to a user via an output device 3. The user can therein initialize the correction measures and/or correction measures modified by the user, via the input device 4. Therein, the control unit 5 is configured to process the correction measures input by the user. The control unit 5 is also configured to produce corrected correction information data, for example, via the first evaluating unit and/or to receive a corrected attenuation map on the basis of the correction measures and to receive PET scan data and to apply the corrected attenuation map to the PET scan data in order to create a quantitative PET image.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'interface' may be replaced with the term 'circuit.'

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The invention claimed is:

1. A method for creating a quantitative positron emission tomography (PET) image of a subject or object, the method comprising:
    recording correction information data with at least one imaging device, the at least one imaging device including at least one of a magnetic resonance scanner, a computed tomography scanner or a positron emission tomography scanner;
    transmitting the correction information data or a first part of the correction information data to a first evaluating unit, the transmitting including at least one of
        preparing an attenuation map based on the correction information data by way of the first evaluating unit and sending the attenuation map as checking data to a second evaluating unit, or
    sending the correction information data or a second part of the correction information data as the checking data to the second evaluating unit;
    assessing the checking data based on a quantity of reference data and detecting possible artifacts in the checking data by way of the second evaluating unit, the assessing including at least one of in the event of the detection of at least one artifact,
        initializing correction measures by way of the second evaluating unit, or proposing correction measures to a user by way of the second evaluating unit via an output device and providing a possibility for the user to initialize at least one of the correction measures or correction measures modified by the user, wherein the correction measures are configured to at least one of weaken or eliminate the at least one artifact; and
    preparing a corrected attenuation map based on the correction measures,
    wherein the corrected attenuation map corresponds to an uncorrected attenuation map if no artifacts have been detected.

2. The method of claim 1, wherein the reference data comprises at least one of reference attenuation maps or reference correction information data.

3. The method of claim 1, wherein at least one of the first evaluating unit or the second evaluating unit comprise a trained algorithm.

4. The method of claim 1, wherein the assessing is based on at least one of reference attenuation maps or reference correction information data in accordance with a predetermined classification of artifacts.

5. The method of claim 1, wherein
the assessing is based on at least one of reference attenuation maps or reference correction information data in accordance with a predetermined assessment measure, and
the predetermined assessment measure comprises differentiating criteria according to which anomalies in the at least one of the attenuation map or in the correction information data are classified as artifact or no artifact.

6. The method of claim 4, wherein the second evaluating unit comprises:
a catalog of measures which are associated with the predetermined classification, the catalog of measures including,
proposed correction measures to the user,
automatic execution of correction measures, and
optional output of information to the user via the output device.

7. The method of claim 1, wherein the artifacts comprise anatomical anomalies, the anatomical anomalies including at least one of,
at least one of missing extremities or implants,
artifacts caused by movement of the subject,
metal artifacts,
Gibbs artifacts,
at least one of aliasing or wrap-around artifacts, or
at least one of artifacts caused by RF noise or artifacts caused by chemical shift.

8. The method of claim 1, wherein the proposing includes outputting additional information regarding the at least one artifact via the output device to the user.

9. The method of claim 1, wherein the correction measures comprise at least one of a repetition of the recording of the correction information data or an adaptation of recording parameters for a recording of the correction information data which is to be repeated.

10. The method of claim 1, wherein
the second evaluating unit is trained via input training data and via output training data,
the input training data comprises at least one of reference attenuation maps or reference correction information data, and
the output training data comprises at least one of a predetermined classification or a predetermined assessment of artifacts in the input training data.

11. A positron emission tomography system (PET) comprising:
an imaging device;
an output device; an input device; and
a control unit configured to actuate the imaging device, wherein the control unit includes,
a first evaluating unit, and
a second evaluating unit, the control unit is configured, to cause the PET system to perform the method of claim 1.

12. A non-transitory computer-readable medium on which a computer program is stored which comprises instructions which, executed by a control unit of a positron emission tomography system, cause the positron emission tomography system to perform the method of claim 1.

13. A non-transitory computer-readable medium on which a computer program is stored which comprises instructions which, executed by a control unit of a positron emission tomography system, cause the positron emission tomography system to perform the method of claim 2.

14. The method of claim 1, further comprising:
receiving positron emission tomography scan data and applying the corrected attenuation map to the positron emission tomography scan data to create a quantitative positron emission tomography image.

15. The method of claim 2, wherein the assessing is based on at least one of reference attenuation maps or reference correction information data in accordance with a predetermined classification of artifacts.

16. The method of claim 15, wherein
the assessing is based on at least one of reference attenuation maps or reference correction information data in accordance with a predetermined assessment measure, and
the predetermined assessment measure comprises differentiating criteria according to which anomalies in the at least one of the attenuation map or in the correction information data are classified as artifact or no artifact.

17. The method of claim 15, wherein the second evaluating unit comprises:
a catalog of measures which are associated with the predetermined classification, the catalog of measures including,
proposed correction measures to the user,
automatic execution of correction measures, and
optional output of information to the user via the output device.

18. The method of claim 17, wherein the artifacts comprise anatomical anomalies, the anatomical anomalies including at least one of,
at least one of missing extremities or implants,
artifacts caused by movement of the subject,
metal artifacts,
Gibbs artifacts,
at least one of aliasing or wrap-around artifacts, or
at least one of artifacts caused by RF noise or artifacts caused by chemical shift.

19. The method of claim 18, wherein the proposing includes outputting additional information regarding the at least one artifact via the output device to the user.

20. The method of claim 19, wherein the correction measures comprise at least one of a repetition of the recording of the correction information data or an adaptation of recording parameters for a recording of the correction information data which is to be repeated.

* * * * *